United States Patent Office 2,783,167
Patented Feb. 26, 1957

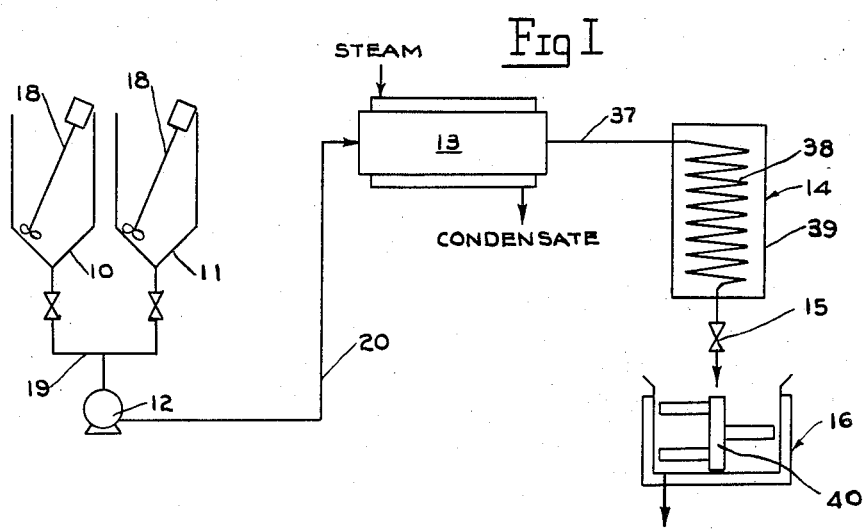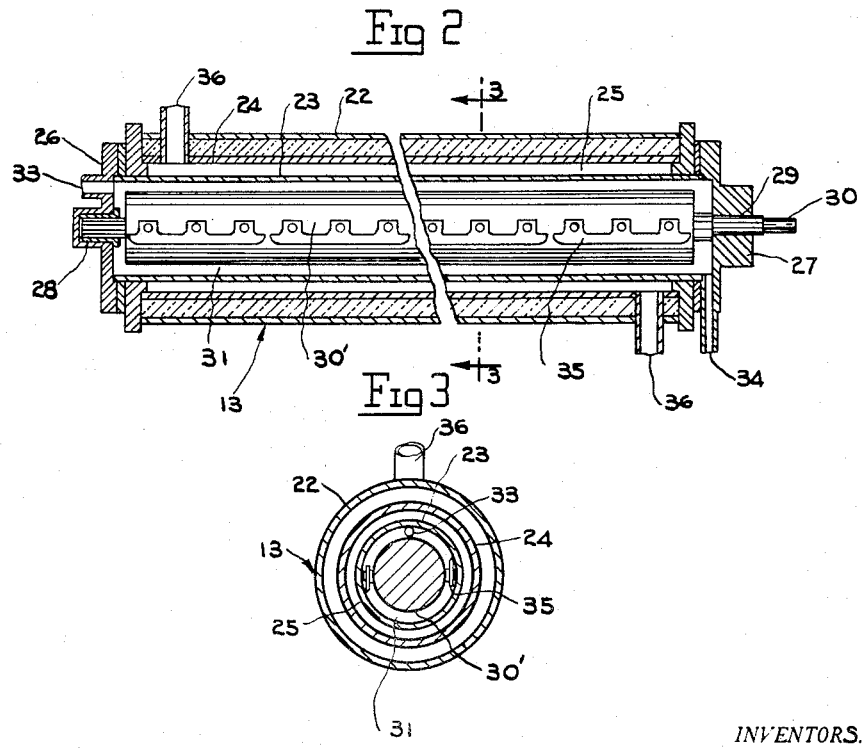

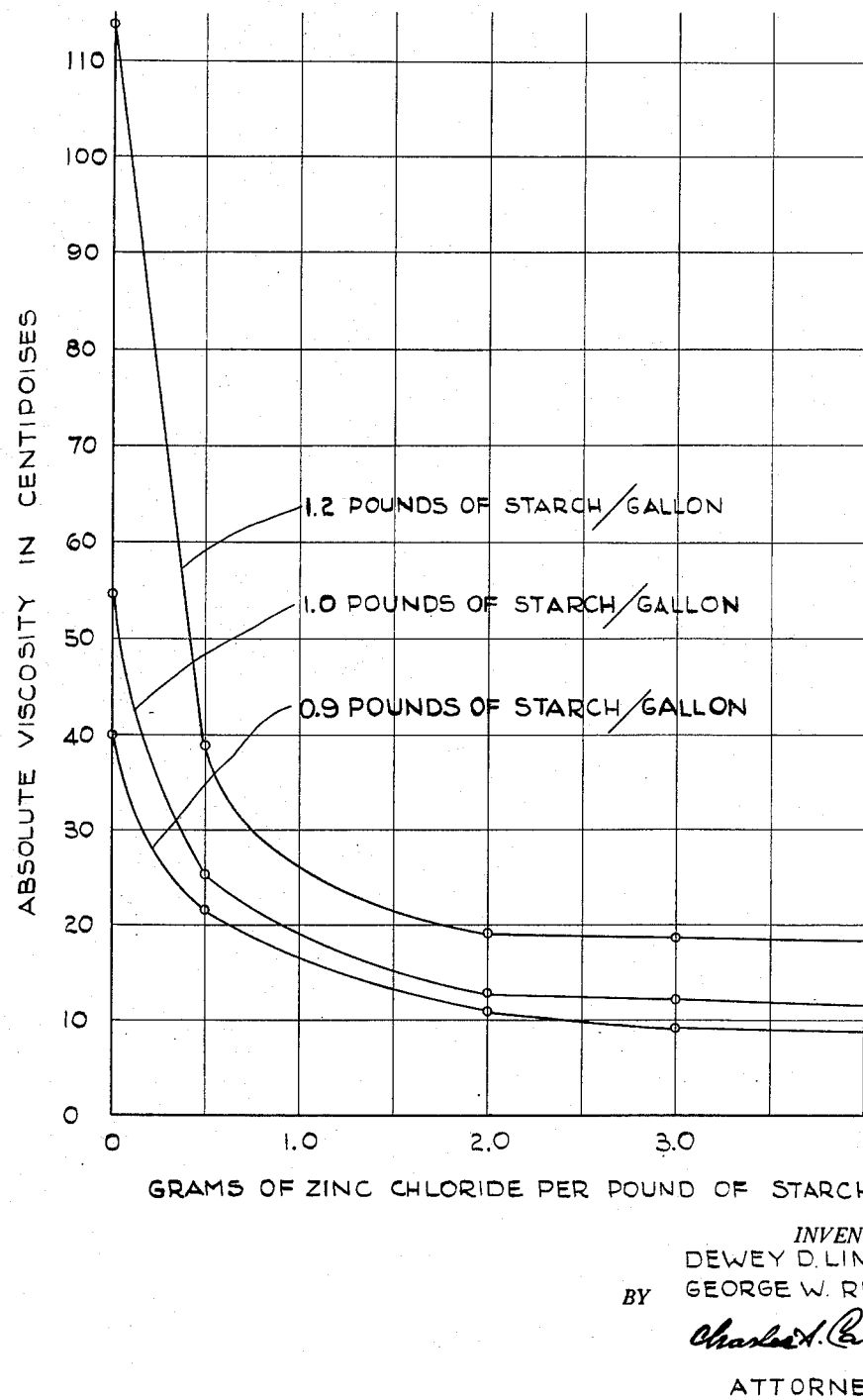

2,783,167

PROCESS FOR SIMULTANEOUSLY GELATINIZING AND CATALYTICALLY MODIFYING STARCH SUSPENSIONS

Dewey D. Lineberry, Louisville, Ky., and George W. Reigel, Clarksville, Ind., assignors to National Cylinder Gas Company, Chicago, Ill., a corporation of Delaware Application August 10, 1953, Serial No. 373,344

8 Claims. (Cl. 127—33)

This invention relates generally to the treatment of starch and more particularly to an improved process for simultaneously effecting gelatinization and modification of starch suspensions to produce continuously hot pastes having relatively low viscosity. The pastes produced by the process of this invention, despite their low viscosity at high temperatures, have been found to possess excellent gel forming properties upon cooling. As a result, our novel process for producing these pastes is remarkably well suited for use in producing textile warp sizing agents, adhesives, and fillers for paper.

Unmodified corn starch does not make a satisfactory warp sizing agent because the viscosity of a suspension or paste made from such starch and containing sufficiently high solids concentration for adequate sizing of the warp fibers is so high that the paste cannot be evenly applied to the warp. As a result most textile manufacturers utilize modified starches purchased in dry form as a starting material in formulating warp size. These modified starches are considerably more expensive than untreated starch with the result that the weaving cost is increased. Moreover, even the modified starches must be subjected to a cooking or gelatinization process in order to form hot pastes suitable for sizing. Unmodified starches are generally not satisfactory for use in adhesives for similar reasons.

Some operators have attempted to modify untreated starches in the textile mill by the use of enzymes or oxidizing agents, but these processes have proven to be expensive and quite difficult to control. As a result, the use of enzyme and oxidation treatment in textile mills is now very limited.

An important object of this invention is to provide a continuous process for converting untreated starch in a single operation into a modified and gelatinized paste or suspension having a low viscosity at an elevated temperature.

Another object is to provide a process for producing a starch paste which, when applied to warp filaments and allowed to dry, produces a protective film about the filaments that is sufficiently tough to protect the warp from breakage, does not flake off, and is sufficiently flexible to withstand the repeated bending and tensioning involved in the weaving operation.

Another object is to provide a process for producing hot pastes from natural starch suitable for use as adhesives or fillers.

We have discovered that suspensions of unmodified starch can be simultaneously modified to reduce hot-paste viscosity and gelatinized to produce excellent film-forming properties by adding a small amount of a soluble zinc salt, preferably the chloride, to a starch suspension to serve as a catalyst and subjecting the suspension to violent agitation under conditions of high temperature and pressure followed by an instantaneous pressure release and temperature drop obtained by flashing moisture to steam on pressure reduction. Our novel process preferably involves heating to a range of from 250° F. to 310° F. and a pressure of from two to five atmospheres. The term soluble zinc salt used herein and in the claims is meant to include only those salts such as zinc chloride, zinc acetate, and zinc sulfate which are quite soluble and produce $Zn^{++}$ ions in aqueous solution. The term does not include the soluble zincates.

We are aware that the use of zinc chloride as a modifying agent has been proposed heretofore, as for example in the 1909 British Patent Number 25,121 where aluminum chloride and zinc chloride are suggested for effecting the liquefaction of amylaceous matters and for rendering flour size soft and pliable. The literature does not suggest, however, that amounts of zinc chloride as small as we employ in our process would be effective in lowering viscosity when a suspension containing the salt is subjected to a high temperature and pressure or that zinc chloride would be markedly superior as a modifying agent to the other salts of other metals which hydrolyze to produce free acids. Moreover, we have determined that the small zinc ion concentrations which we employ have virtually no catalytic effect at temperatures less than 250° F. Additionally, the prior art does not disclose a process involving zinc as a catalyst for effecting simultaneous modification and gelatinization in a single operation.

Other objects and advantages of the process of our invention will present themselves to those familiar with the art upon reading the following description of the process and a preferred system of apparatus for carrying out the process in conjunction with the drawings, in which:

Fig. 1 is a schematic diagram of a preferred system of apparatus for practicing the process of this invention;

Fig. 2 is a longitudinal section of a preferred form of heat exchange unit;

Fig. 3 is a transverse section taken on line 3—3 of Fig. 2; and

Fig. 4 is a graph showing the effect of the addition of varying amounts of zinc chloride to starch slurries having different solids concentrations and processed in accordance with our invention.

The novel process of this invention can best be described by reference to the preferred system of apparatus for carrying out this process. As shown in Fig. 1, this system comprises a pair of identical slurry tanks 10 and 11, a pump 12, a jacketed heat exchange unit 13, a holding section 14, a back-pressure valve 15, and an agitator equipped receiving tank 16.

Each of the slurry tanks 10 and 11 is provided with a motor driven agitator 18 and is connected with valved piping 19 to the inlet side of the pump 12. The valve arrangement is such that either tank may be connected to the pump while a batch of slurry is formed in the other tank. Thus, the ingredients may be weighed and measured in separate batches, yet the system may be operated on a continuous basis.

The outlet of the pump 12 is connected by a suitable pipe 20 to the inlet of the heat exchange unit 13. This unit is shown in detail in Figs. 2 and 3. An insulated jacket 22 surrounds a heat transfer tube 23, and the inner wall 24 of the jacket 22 is spaced from the tube 23 to define an annular space 25 for the heating medium. The heat transfer tube 23 preferably has a relatively thin wall and is constructed of a metal having a high degree of thermal conductivity so that heat may flow readily from the medium in the space 25 to the interior of the tube 23. The unit 13 is provided with end members 26 and 27 which support the jacket elements and the tube 23. These members are provided with suitable bearings 28 and 29 in which a shaft 30 is journalled for rotation. This shaft may be driven by any suitable driving means not shown. That portion of the shaft 30' disposed within the tube 23 is enlarged in diameter, defining with the tube 23 a narrow annular space 31 through which the starch suspension or slurry flows. Slurry enters this space through a suitable inlet connection 33 provided in the end member 26 and exits from the space through an outlet connection 34 provided in the other end member 27. The enlarged portion of the shaft 30' is provided with two or more rows of scraper blades 35 which serve to remove films forming on the inner surface of the tube 23 practically as rapidly as they are formed and to violently agitate the material flowing through the thin annular space 31. The heat transfer medium, which is preferably steam, is conducted to and from the jacket space 25 by suitable connections 36. The construction and details of the preferred form of heat exchange unit are more fully described in U.S. Patent 2,481,436 granted to Bruce D. Miller for Improvements in Processing Starch Pastes, reference to which is hereby made.

From the heat exchange unit 13 the product is conducted to the holding section 14 by a conduit 37. The holding section comprises a length of tubing wound into a coil 38 and surrounded by an insulated enclosure 39. If desired, the enclosure may include a jacket space for heating medium in order to maintain a suitable temperature, but in most instances it has not been necessary to do any more than insulate the coil 38. Other conventional means for holding the slurry at an elevated temperature may be employed instead of the simple arrangement illustrated if desired. A large diameter jacketed conduit, with or without an agitator, serves as an effective holding section.

The back pressure valve 15 is preferably connected directly to the outlet of the holding section and preferably discharges directly into the receiving tank 16. This tank is provided with a slow speed agitator or stirrer 40 and is jacketed for heating medium to maintain the gelled, modified starch suspension at the desired temperature until such time as it is to be used.

In general the system of apparatus functions as follows in carrying out the process of our invention: A batch of slurry is made up in one of the tanks 10 or 11 by charging a predetermined volume of water and sufficient unmodified starch to form a suspension having the desired concentration. The water, which should be at a temperature below 180° F., is preferably buffered to a pH of about 7 prior to the starch addition, but this is not necessary to the process. Next a known amount of soluble zinc salt, equivalent in activity to a concentration of zinc chloride of from about one-half gram to about three grams per pound of starch, is added to the slurry. Other additives such as conventional softeners, which are oil or fat products, or conventional anti-foaming agents may be added directly to the slurry or preferably may be metered into the processed suspension after completion of the modification and gelatinization step.

The well-mixed slurry is pumped continuously from the tank to the heat exchange unit by the pump 12. The pump also serves to raise the pressure of the slurry to a suitable pressure well above the vapor pressure of water at the highest temperature to which the slurry is to be heated. In the heat exchange unit, the slurry is rapidly heated to a temperature sufficiently high to activate the zinc catalyst and within a range of from about 250° F. to about 310° F. During this heating, which occurs in a matter of a few seconds and is controllable by conventional control equipment to plus or minus one degree Fahrenheit, the high degree of agitation produced by the rapidly rotating scraper blades facilitates the starch granule breakdown and viscosity lowering action of the catalyst and the resulting controlled gelatinization of the starch.

The gelatinization and modification continues in the holding section where the high temperature is preferably maintained upon the flowing stream for a period of at least about two minutes. On emerging from the holding section the pressure and temperature are suddenly lowered upon passage of the stream through the back pressure valve. The sudden release of the pressure is believed to bring about a very beneficial effect upon the product, for the starch granules are further broken down by the rapid expansion and cooling which occurs because of rapid evaporation of water as the pressure is released.

The following specific examples illustrate our novel process in greater detail:

Example A

Nine pounds of unmodified corn starch were mixed with 68.5 pounds of water maintained at about 60° F. in a tank equipped with an agitator. Prior to the addition of the starch 0.75 grams of sodium acid sulfate were added to the make-up water to act as a buffer and lower the pH of the city water from 8.7 to 7.0. Nine grams of zinc chloride were added to the batch of slurry and thoroughly mixed therein. This produced a slurry having a zinc chloride concentration of one gram per pound of starch and a starch concentration of one pound per gallon. After the zinc chloride addition, the pH of the slurry was found to be 5.6.

After being thoroughly mixed, the slurry was pumped continuously from the tank through a scraped surface heat exchange unit of the type described above at the rate of 105 pounds per hour and under a pressure of 110 pounds per square inch gage. The jacket of the heat exchange unit was supplied with steam at 315° F. and the starch slurry emerged at a temperature of 290° F. The heat exchange unit had an annular space for the material being processed 12 inches long. The shaft diameter was 2½ inches and the inside diameter of the heat transfer tube was three inches. Thus, the thickness of the space was ¼ inch. The shaft speed in the heat exchange unit was about 500 R. P. M. After being heated, the slurry passed into an insulated holding coil wound from a 40 foot length of ⅝ inch outside diameter tubing where its temperature was maintained above 280° F. for four minutes. At the outlet of the coil the pressure upon the slurry was reduced to atmospheric by passage through a back-pressure valve, and the resultant evaporation of a portion of the water caused an immediate temperature drop to about 200° F. After the pressure reduction step the slurry was conducted to a jacketed receiving tank provided with a slow speed agitator where its temperature was maintained at 200° F. The viscosity of the gelatinized, modified slurry was continuously measured while in the receiving tank and found to be 21 centipoises. The pH of the processed slurry was checked and found to be 5.7.

Example B

The identical procedure was followed as in Example A except that no zinc chloride was added to the slurry. The viscosity of the processed slurry was found to be 55 centipoises (more than double the viscosity of the product of Example A) illustrating the remarkable catalytic effect of the zinc ion at high temperatures. Incidentally, the pH of the starch and water slurry before the heating step was found to be the same in this control run as in Example A indicating that hydrolysis of the zinc chloride to form hydrogen ions has little or no effect in the reaction. This fact distinguishes our process from the prior art processes in which the hydrolysis of acidic salts was employed to effect an acid modification of the starch molecule.

Example C

A number of slurries having starch concentrations of 1.2, 1.0, and 0.9 pounds per gallon were prepared and processed in conformity with the conditions of Example A. Varying amounts of zinc chloride were included in these slurries, the zinc chloride content ranging from zero to 3.0 grams per pound of starch. The viscosities of the various slurries after processing are plotted in Fig. 4 of the drawings, and the resultant curves graphically illustrate the remarkable effect of adding as little as one-half gram of the catalyst per pound of starch. The diminishing returns of adding more than three grams of zinc chloride per pound of starch are shown by the leveling off of the curves with zinc chloride concentrations over 3 grams per pound.

*Example D*

In order to determine the optimum holding time after the heating step, slurries were prepared in accordance with the procedure outlined in Example A and containing one gram of zinc chloride per pound of starch and one pound of starch per gallon of water. These slurries were passed through the heat exchange unit to raise the temperature to 290° F. just as in Example A, but the holding times were varied by utilizing shorter pipe coils to produce holding times less than four minutes and by utilizing a decreased rate of flow and longer coil to produce a holding time greater than four minutes. The final viscosities of the finished product are given in the following table:

| Holding time in minutes: | Viscosity in centipoises |
| --- | --- |
| 0 | 52 |
| 2 | 22.5 |
| 4 | 18 |
| 8 | 17.5 |

From the foregoing table it appears that the optimum high temperature holding time is about four minutes, but that beneficial results can be obtained with holding times ranging upwardly from about two minutes.

*Example E*

In order to determine the temperature to which the slurry had to be heated in order to accomplish the desired viscosity reduction, a slurry was prepared in accordance with Example A and was processed at different temperatures by varying the jacket temperature of the heat exchange unit from 253° F. to 313° F. The results of this run were as follows:

| Temperature of slurry at outlet of heat exchange unit: | Product viscosity in centipoises |
| --- | --- |
| 230 | 60 |
| 250 | 60 |
| 270 | 38 |
| 290 | 18.5 |

From the foregoing table, it is apparent that processing temperatures of less than 270° F. are not very effective at the optimum holding time. Temperatures in excess of 310° F. have been found to produce dextrinization if maintained for as long as four minutes and are accordingly undesirable. Actually, a critical time-temperature relationship is involved and higher temperatures above 290° F. may be used with shorter holding times and lower temperatures with longer holding times. The 290° F. temperature and four minute holding time is felt to be optimum for most processing installations. However, if high processing rates are desired, considerable apparatus is required to maintain the slurry at the elevated temperature and pressure for that length of time, and it is often easier to employ a higher temperature and proportionately shorter holding time. By the same token, when high pressure steam is not available it is practical to use a lower processing temperature and a longer holding time. Temperatures less than 250° F. are felt to be too low regardless of holding time because the activity of the catalyst does not manifest itself at such low temperatures.

*Example F*

Six slurry batches were made successively and continuously processed. Each batch contained the following.

100 lbs. of Pearl starch (Globe #3057)
50 grams of zinc chloride
8 lbs. of softener (Seyco)
Sufficient water to make the total batch 100 gallons This slurry was continuously heated to 290° F. in an agitated heat exchange unit similar to that described in Example A but substantially larger, the heat transfer tube being 40 inches in length. The back pressure during heating was maintained at 90–130 p. s. i. g. and a rate of 945 pounds per hour was processed. Following heating the slurry was passed through a holding section where the temperature was maintained slightly below 290° F. to a pressure reducing valve where the pressure was instantaneously reduced to atmospheric. The time in the holding section was six and one-half minutes. After the pressure reduction, the processed material was conducted to an agitated slasher box where it was utilized as a textile warp size. The viscosity of the slasher box was measured at short intervals during the run and was found to be 19 seconds, Zahn Cup at 207° F., plus or minus one second for all six batches. 19 seconds Zahn is the equivalent of about 13 centipoises absolute viscosity.

During this test eighteen warp beams were sized and were later utilized in weaving cloth with excellent results and high weaving efficiency. Pick up analysis of four samples from the eighteen warp beams revealed that the percent pick up lay within the narrow range of 11.9% to 12.2% and that the moisture content was constant at 6.5%. These analyses illustrate the consistency of our novel process.

Incidentally, the starch utilized in this example was an unmodified corn starch similar to that used in the foregoing examples. The process is not limited to corn starch, however, for various test runs have been made utilizing other starches such as potato and the results have been comparable to those reported in the detailed examples.

*Example G*

In order to determine whether direct steam injection into the stream of starch slurry could be utilized, the following method was employed: An initial slurry was formed in a tank by adding nine pounds of unmodified corn starch to 59.6 pounds of city water (pH 8.7). Six cubic centimeters of a 50% by weight zinc chloride solution were added to the slurry to produce a catalyst concentration of about ½ gram per pound of starch, and the slurry was thoroughly mixed. This slurry was pumped through a heat exchange unit identical to that described in Example A at a rate of 150 pounds per hour and a back pressure of 65 p. s. i. g. The initial slurry temperature was 56° F. Saturated steam under a pressure of 15 p. s. i. g. was injected into the slurry line just ahead of the pump at a rate of about 19 pounds per hour. This raised the temperature of the slurry fed to the heat exchange unit to about 195° F. and diluted the slurry to a starch concentration of about one pound per gallon. The heat exchange unit jacket temperature was maintained at about 328° F. and the diluted slurry emerged from the unit at a rate of about 170 pounds per hour and had a temperature of 290° F. The holding time was four minutes as in Example A. The final viscosity of the product was about 25 centipoises, indicating that direct steam injection to increase the capacity of the heat exchange unit has no adverse effect.

In order to more fully understand the catalytic action of soluble zinc salts at elevated temperatures, several check runs have been made. To determine whether the active ion was the zinc ion or the chloride ion, tests were made utilizing a procedure similar to that of Example A with other chloride salts. Aluminum chloride produced a troublesome hydroxide precipitate at the temperatures utilized and is considered impracticable. Calcium chloride produced a final viscosity of about 55 centipoises when a slurry containing it instead of zinc chloride was processed in acocrdance with Example A. Equivalent amounts of hydrochloric acid instead of zinc chloride also produced virtually no viscosity reduction.

To determine whether the zinc must be present in soluble form capable of producing zinc ions, a test run was made using an equivalent weight of zinc oxide in the slurry instead of zinc chloride, and no appreciable reduction in viscosity was found to occur. Consequently, it is presumed that the active factor is the zinc ion.

From the foregoing description it will be apparent that an improved modification process has been provided which is readily controllable to produce hot suspensions of modified starch having predetermined desired viscosities. Moreover, the suspensions have been found to be quite stable for considerable periods of time with very little change in viscosity or other properties occurring so long as they are held at a uniform temperature. Although the emphasis in the foregoing description has been placed upon the production of suspensions which are particularly suitable for warp sizing the process of our invention is in no wise limited to that field, for it has utility in many other fields where low viscosity hot pastes are utilized.

What is claimed is:

1. A process for simultaneously modifying and gelatinizing an aqueous suspension of starch which comprises effecting solution in said suspension of a soluble zinc salt in such amount as to produce a zinc concentration of at least about one quarter gram of zinc per gallon of aqueous medium, the zinc salt ionizing to produce positively charged zinc ions in solution, heating the suspension to a temperature between about 250° F. and about 310° F., holding the suspension above 250° F. for sufficient time to permit gelatinization of the starch granules and to allow the zinc ions to effect depolymerization of the starch molecules, and subjecting the suspension to superatmospheric pressure during the heating and holding times.

2. The process of claim 1 in which the zinc salt is the chloride.

3. The process of claim 1 in which the suspension is heated to a temperature between 270° F. and 300° F. and maintained in said range for a period of at least about two minutes.

4. The process of simultaneously modifying and gelatinizing starch comprising forming a slurry of starch in water containing at least one half gram of zinc chloride per pound of starch, raising the pressure upon said slurry, heating said slurry to a temperature of between about 250° F. and 310° F., maintaining the temperature within said range for a short period sufficient to permit gelatinization of the starch granules and to allow the zinc ions to effect depolymerization of the starch molecules and next releasing the pressure upon said slurry to effect flash chilling to a temperature below the atmospheric boiling point thereof by evaporation of a small portion of the water in said slurry.

5. A process for continuously producing a modified starch suspension having relatively low viscosity when hot and good gel forming properties when cooled, said process including the following steps: forming an aqueous slurry containing about one pound of starch per gallon of slurry and containing between one half gram and three grams of zinc chloride per pound of dry starch, elevating the pressure and pumping a stream of said slurry through a heating zone to rapidly raise the temperature of the stream to between about 250° F. and about 310° F., simultaneously agitating said stream in said zone to improve the rate of heat transfer and to effect disintegration of the starch granules, maintaining said stream at a temperature in said range for at least about two minutes to permit the gelatinization of the starch granules and to allow the zinc chloride to effect depolymerization of starch molecules, and next cooling said stream to a temperature below the atmospheric boiling point of the suspension.

6. A process for continuously producing a modified starch suspension having relatively low viscosity when hot and good gel forming properties when cooled, said process including the following steps: forming an aqueous slurry containing about one pound of starch per gallon of slurry and containing at least about one half gram of zinc chloride per pound of dry starch, elevating the pressure and pumping a stream of said slurry through a heating zone to rapidly raise the temperature of the stream to about 290° F., simultaneously agitating said stream in said zone to improve the rate of heat transfer and to effect disintegration of the starch granules, maintaining said stream at a temperature above 250° F. for at least about four minutes to permit the gelatinization of the starch granules and to allow the zinc chloride to effect depolymerization of starch molecules, and next reducing the pressure on said stream to atmospheric to effect flash cooling thereof to a temperature below the boiling point of the resultant suspension.

7. A process for continuously producing a modified gelatinized starch suspension having relatively low viscosity when hot and good gel forming properties when cooled, said process including the following steps: forming an aqueous slurry containing about one pound of starch per gallon of slurry and containing a water soluble zinc salt in such amount as to yield a zinc ion concentration at least equivalent to that obtainable with one half gram of zinc chloride per gallon of slurry, pumping a stream of said slurry at an elevated pressure through a heating zone to rapidly raise the temperature of the stream to about 290° F., simultaneously agitating said stream in said zone to improve the rate of heat transfer and facilitate disintegration of the starch granules, maintaining said stream at a temperature above 250° F. for at least about two minutes to permit the gelatinization of the starch granules and to allow the zinc ion to effect depolymerization of starch molecules, and rapidly cooling said stream from the last mentioned temperature to a temperature less than the atmospheric boiling point of the suspension.

8. A process for continuously producing a modified gelatinized starch suspension having relatively low viscosity when hot and good gel forming properties when cooled, said process including the following steps: forming an aqueous slurry containing about one pound of starch per gallon of slurry and containing a water soluble zinc salt in such amount as to contain about one quarter gram of zinc per pound of dry starch, pumping a stream of said slurry at an elevated pressure through a heating zone to rapidly raise the temperature of the stream to between about 250° F. and about 310° F., maintaining said stream at a temperature above 250° F. for sufficient time to permit the gelatinization of the starch granules and to allow the zinc ion to effect depolymerization of starch molecules, and next cooling said stream from the last mentioned temperature to a temperature less than the atmospheric boiling point of the suspension.

References Cited in the file of this patent

UNITED STATES PATENTS

| | | |
|---|---|---|
| 1,284,495 | Tunnell | Nov. 12, 1918 |
| 1,661,201 | Stern | Mar. 6, 1928 |
| 2,198,785 | Mohr et al. | Apr. 30, 1940 |
| 2,481,436 | Miller | Sept. 6, 1949 |
| 2,619,428 | Kerr | Nov. 25, 1952 |

FOREIGN PATENTS

| | | |
|---|---|---|
| 12,947 | Great Britain | of 1850 |
| 25,121 | Great Britain | of 1909 |
| 135,000 | Austria | May 15, 1933 |